Aug. 4, 1936.    J. M. SHOEMAKER    2,049,751
ENGINE COOLING MEANS
Filed June 14, 1935    2 Sheets-Sheet 1

INVENTOR.
James M. Shoemaker
BY
Harris G. Luther
ATTORNEY

Aug. 4, 1936.  J. M. SHOEMAKER  2,049,751
ENGINE COOLING MEANS
Filed June 14, 1935   2 Sheets-Sheet 2
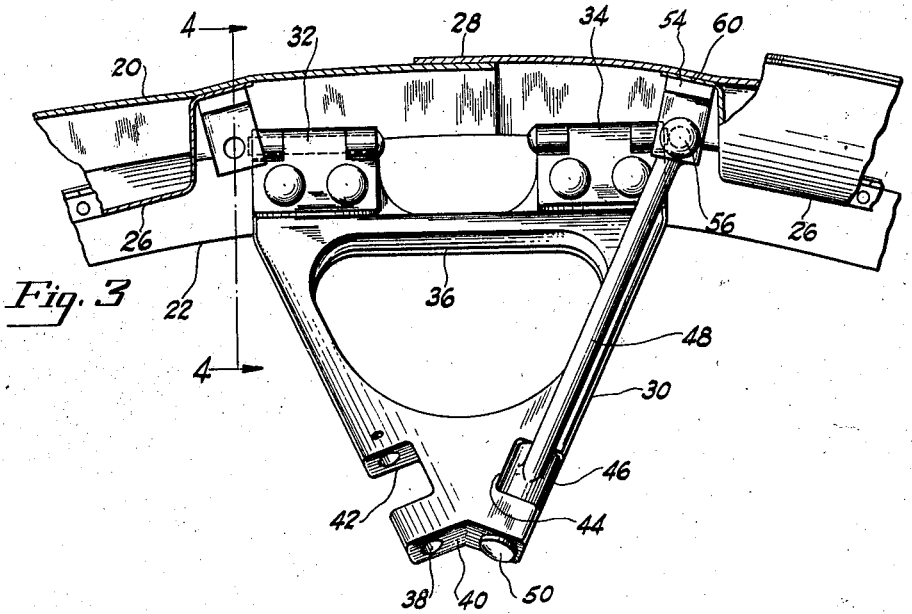
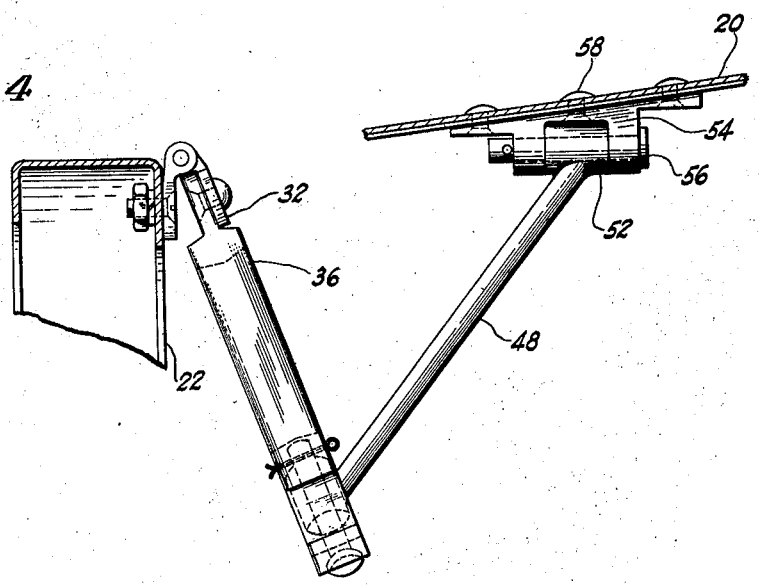
INVENTOR.
James M. Shoemaker
BY Harris G. Luther
ATTORNEY Patented Aug. 4, 1936

2,049,751

UNITED STATES PATENT OFFICE 2,049,751

ENGINE COOLING MEANS

James M. Shoemaker, Hartford, Conn., assignor to United Aircraft Corporation, East Hartford, Conn., a corporation of Delaware Application June 14, 1935, Serial No. 26,631

9 Claims. (Cl. 123—171)

This invention relates to improvements in engine cooling means and has particular reference to an improved cooling means for an internal combustion engine mounted upon an aircraft to provide power for the propulsion of the aircraft.

An object of the invention resides in the provision in combination with a stream line cowl surrounding an aircraft engine of engine cooling or ventilating flaps hingedly supported at the trailing edge of the cowl and adjustable to increase or decrease the amount of air flowing through said cowl and a light, rigid, and simple mechanism for adjusting such flaps. A further object resides in the provision of a flap adjusting mechanism so constructed that movement of one flap by a manually operable flap adjusting device will cause all of the flaps to move in substantially the same degree.

Other objects and advantages will appear as the description proceeds.

In the accompanying drawings I have illustrated a suitable mechanical embodiment of what is now considered to be the preferered form of the invention. The drawings, however, are for the purpose of illustration only and are not to be taken as limiting the invention, the scope of which is to be measured entirely by the scope of the appended claims.

Figure 1:
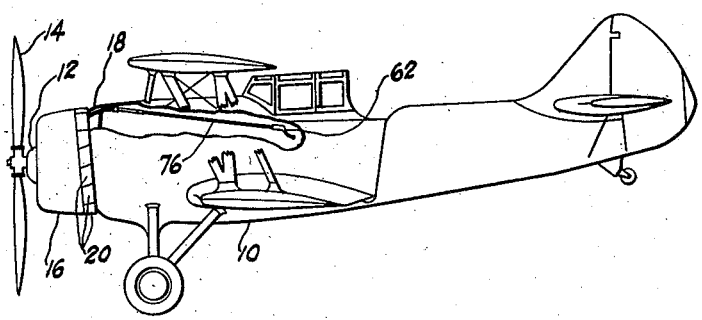
Figure 2:
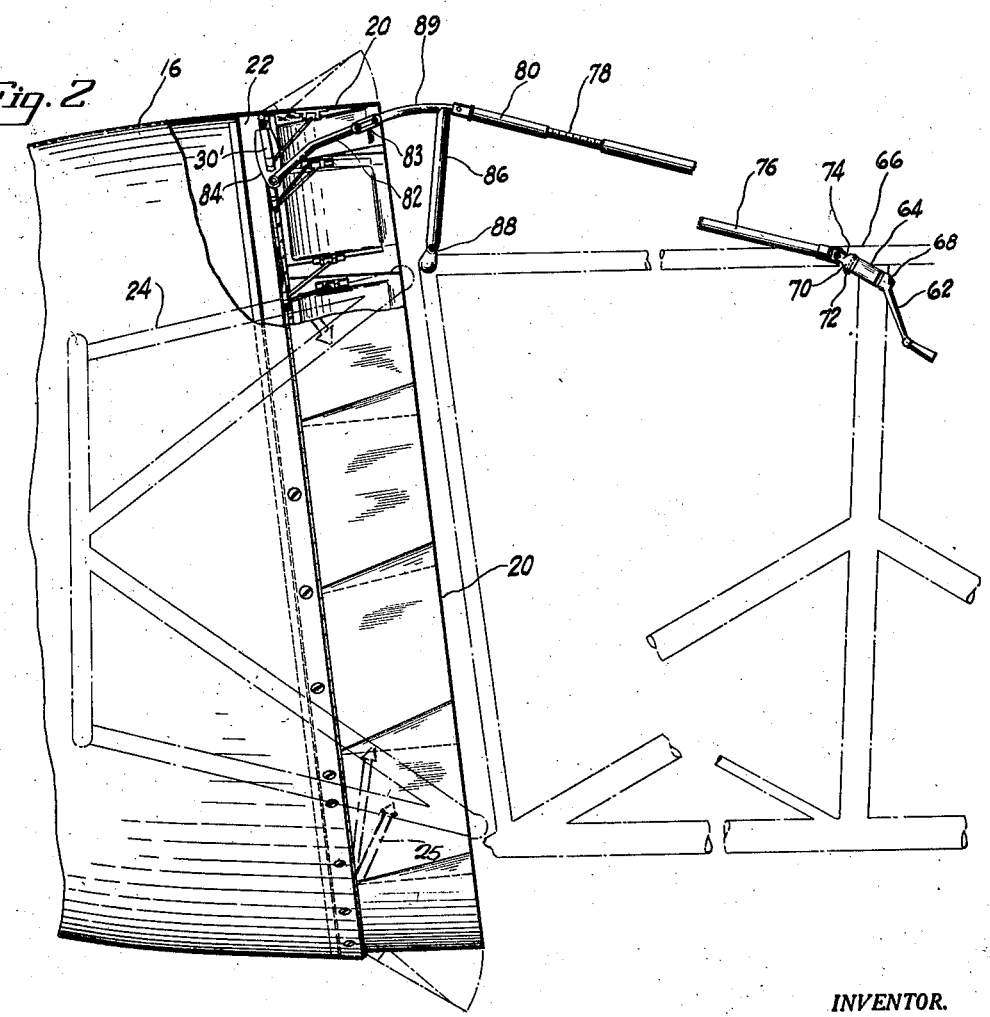

In the drawings, Fig. 1 is a side elevational view of an airplane showing engine cooling means constructed according to the idea of this invention applied thereto, a portion thereof being broken away to better illustrate the application of the device of the invention to the airplane. Fig. 2 is a view on an enlarged scale of a fragmentary portion of the airplane illustrated in Fig. 1 showing in detail the engine cooling flaps hinged at the trailing edge of the engine cowl and the improved flap operating mechanism, a portion of the engine cowl being broken away to better illustrate the flap operating mechanism. Fig. 3 is a perspective view of one unit of the flap operating mechanism, the flaps to which the unit is attached being shown in section. Fig. 4 is a sectional view taken on the line 4—4 of Fig. 3 showing the flap operating unit illustrated in Fig. 3 in side elevation.

Referring to the drawings in detail, and particularly to Fig. 1, the drawings illustrate an airplane having a fuselage 10, upon the front end of which is secured an engine 12 which may be a radial air cooled engine commonly used for the propulsion of airplanes. The invention, however, is not limited to an engine mounted upon the fuselage as the engine may be mounted upon a wing or upon any other portion of the airplane which will form a suitable support therefor, and there may be either one or a plurality of engines mounted upon the same airplane. The engine drives a propeller 14 which provides tractive force for the propulsion of the airplane and also provides a blast of air commonly referred to as the propeller slip stream which flows over the engine and carries away the excess heat developed by the engine during power operation. When the airplane is in flight an additional air blast induced by the forward movement of the airplane also flows past the cooling surfaces of the engine to carry away the excess heat thereof. The engine is surrounded by a stream line cowl 16 substantially circular or annular in cross section and contoured longitudinally to reduce, in so far as possible, the resistance of the air to the passage of the engine and fuselage therethrough. This cowl is open at both ends to permit cooling air to flow through the cowl and past the cooling surfaces of the engine and the rear or trailing edge of the cowl is spaced forwardly from the forward end or shoulder 18 of the fuselage to provide an annular slot known as a gill opening through which the air taken in at the open forward end of the cowl and flowing past the cooling surfaces of the engine may be vented. It has been found that an additional volume of air may be induced to flow through the cowl by providing the trailing edge of the cowl with an outward flare surrounding the gill opening, however, as such a flare adds materially to the drag of the airplane, it has been found desirable to make such a flare adjustable by providing at the trailing edge of the cowling a series of hinged adjustable flaps extending substantially entirely around the edge of the cowl and so arranged that they may be extended outwardly to provide a flare to induce an additional amount of air to flow through the cowl when additional cooling of the engine is required and which may be retracted to continue the stream line contour of the cowl and thereby reduce the drag effect when additional cooling of the engine is not necessary. For a more complete description of such trailing edge flaps and their function, reference may be had to application Serial No. 705,094 of Rex B. Beisel for Air regulating means, filed January 3, 1934. In the present invention, a series of similar flaps 20 are hinged at their forward ends to a ring 22 positioned at the rear or trailing edge of the cowl 16. The ring 22 may be a reinforcing member secured to and carried by the cowl but is preferably an independent member rigidly mounted upon the members of the engine supporting frame 24 by suitable means such as the struts 25 and supports the trailing edge of the cowl as well as the flaps 20.

Referring to Fig. 3, it will be observed that each of the flaps 20 is in the form of a substantially rectangular plate of sheet metal and is reinforced by a box construction 26 secured to the underside thereof, this reinforcment rendering the flaps rigid to resist the bending and twisting forces to which they are subjected when extended outwardly to provide a flare at the trailing edge of the cowl as described above. The edges of adjoining flaps are overlapped as indicated at 28, the edge of each successive flap farthest from the top center of the cowl underlying the adjacent edge of the next succeeding flap so that when the two uppermost flaps are extended all of the other flaps will be forced outwardly, the outward movement extending from the top flap around each side of the cowling to the bottom flap. It has been found, however, that owing to the excessive air pressures on these flaps when they are even slightly extended, an additional means must be provided to transmit the outward movement from each flap to the next succeeding flap as otherwise the force exerted upon the two upper flaps will soon be lost in friction between the overlapping edges of the flaps and in distortion of the flaps due to the excessive loads placed thereon. This reinforced construction also obviates the tendency of the flaps to flutter or vibrate under the effect of turbulence of the air stream passing over them.

In order to carry the opening movement of the two upper flaps around each half circumference of the cowl, without any material diminution in the degree of movement transmitted from one flap to the next, I have provided a plurality of units one of which is illustrated in detail in Figs. 3 and 4. As all of these units are exactly similar, it is believed that a description of only one of them is sufficient for the purpose of this disclosure.

A substantially triangular member 30 is hinged at its base to the ring 22 in such position that its center line underlies the center line of the overlap 28 between two adjacent flaps 20. The hinges 32 and 34 by means of which the member 30 is secured to the ring 22 are disposed at the extreme opposite ends of the base of the triangular member and are made sufficiently strong and rigid to resist the torsion or twist to which the member is subjected during the opening of the flaps. The hinged lever member 30 is preferably provided with an opening 36 to reduce the weight thereof and may also be further provided with an I section to further reduce the weight without materially reducing the strength. At its outer or free end the hinged lever member 30 is provided with bores or wells as indicated at 38 which extend from the outer end parallel to the adjacent sides of the triangular member, the outer end of the member being preferably cut away to provide faces as indicated at 40 extending at right angles to the axes of the bores or wells 38. Intermediate the length of the bores 38 the sides of the triangular member 30 are provided with notches as indicated at 42 and 44 to receive the bearing ends 46 of a pair of link members, one of which is indicated at 48. Bearing pins, one of which is indicated at 50, are inserted into the bores 38 and through the bearing end 46 of the links 48 to pivotally secure the ends of the links to the outer end of the triangular member 30 for swinging movement in a plane disposed at right angles to the corresponding side of the triangular member so that these link members may follow the movement of the flaps as they swing about their respective non-parallel hinge axes.

Each link 48 extends upwardly and somewhat rearwardly from the free end of the hinged lever member 30 to an upper bearing end 52 which is pivotally secured to one of the flaps 20 by means of an apertured bearing member 54 and a bearing pin 56. The bearing member 54 comprises a base portion and a pair of outwardly extending apertured ears with a notch between them receiving the bearing end 52 of the link 48 as clearly illustrated in Fig. 4, and is secured to the flap 20 at a location intermediate its length and width by suitable means such as the rivets 58, the location of the bearing member 54 preferably being such that the base portion thereof rests upon the outwardly flanged edge 60 of the reinforcing box member 26.

When all of the units as described above are assembled, together with the flaps 20, upon the ring 22, each flap is provided with two bearing members 54 symmetrically located upon opposite sides of the center of the flap, and each of the triangular hinged levers 30 is connected by the two links 48 which it carries to two adjacent hinged flaps so that when one flap is moved the movement of such flap is transmitted through its connecting link 48 to the free end of the hinged lever member 30 and hence to the other link 48 connected to the free end of this hinged lever member and through the second link to the adjacent flap 20, thus causing all of the flaps to move in unison when one flap is moved.

The shape of the triangular member 30 and the relation between the axes of the hinges 32 and 34 and the pins 50 and 56 is so correlated that all of the hinge and pivot bearings may have a tight bearing fit and at the same time the flaps will move inwardly or outwardly together without binding or dragging.

In order to provide a manual control for the ventilating or engine cooling trailing edge cowl flaps, I have provided a suitable mechanism particularly illustrated in Fig. 2 which comprises a crank 62 having its stem rotatably mounted in a bearing 64 secured to the fuselage frame 66 of the airplane, the stem being restrained against axial movement relative to the bearing by means of an integral shoulder 68 on the crank end thereof and a cap 70 secured upon the end thereof remote from the crank by means of a through bolt 72. The cap 70 is provided with a pair of outwardly extending apertured ears 74 which form a part of a universal joint by means of which a tubular shaft 76 is secured to the crank, the end of the shaft 76 remote from the crank is internally screw threaded and receives a screw threaded stud 78 connected to a link 80 which is in turn connected, by means of a second link 82 and a pivotal joint 83, to an extension 84 provided on the uppermost hinged lever member which is designated in Fig. 2 as 30'. If desired the link 80 may be supported above the fuselage frame 66 by means of a supporting lever member 86 pivotally secured at its lower end to the fuselage frame member by a pivotal connection indicated at 88, and provided at its upper end with a link connecting extension 89.

From the above description it will be observed that by turning the crank 62, the stud 78 may be screwed into and out of the tubular rod 76, thus shortening or lengthening the distance between the bearing 64 and the forward end of the link 80 thereby exerting a force upon the extension 84 which tends to move the member 30' outwardly or inwardly to raise or lower the two upper flaps 20, the reaction to the force upon the member 30' being taken by the bearing 64. As explained above, when the two upper flaps are moved, as by turning the crank 62, this movement is transmitted to all of the other flaps in the series, the movement progressing from the upper two flaps around each side of the circumference of the cowl to the two lowermost flaps so that by means of a single operating member the entire series of flaps may be extended or retracted to change the gill opening behind the cowl and thereby vary the amount of air flowing through the cowl and past the cooling surfaces on the engine.

While I have illustrated and described a particular mechanical embodiment of the idea of my invention, it is to be understood that the invention is not limited to the particular embodiment so illustrated and described, but that such changes in the size, shape and arrangement of parts may be resorted to as come within the scope of the subjoined claims.

Having now described my invention so that others skilled in the art may clearly understand the same, what I desire to secure by Letters Patent is as follows.

What I claim is:

1. In an airplane, in combination, a cowl, flaps adjacent to the trailing edge of the cowl to control the flow of air therethrough, and means for adjusting said flaps comprising, a plurality of lever members hingedly secured adjacent to the trailing edge of said cowl each lever member underlying the adjoining edges of two adjacent flaps, a pair of link members pivotally secured to the free end of each lever member and pivotally secured one to each of said adjacent flaps, and hand operated means for moving said hinged lever members to extend or retract said flaps.

2. In an airplane, in combination, an engine cowl of substantially circular cross section, a series of flaps hinged adjacent to the trailing edge of said cowl and adjustable to control the flow of air therethrough, and means for adjusting said flaps comprising a plurality of substantially triangular lever members each hinged at its base adjacent to said flap hinges and underlying the adjoining edges of two adjacent flaps, a pair of link members pivotally secured to said lever member adjacent its free end each one of said pair of link members being secured at its opposite end to one of said adjacent flaps and the other of said link members being pivotally secured to the other of said adjacent flaps, and manually actuatable means for moving said lever members to extend or retract said flaps.

3. In combination with an annular cowl, flaps hinged adjacent to the trailing edge of said cowl, and means for operating said flaps, said means comprising, lever members hinged adjacent to said flap hinges and so arranged that one lever member underlies the overlapping edges of each two adjoining flaps, a pivoted link extending from the free end of each lever to an intermediate portion of each of the corresponding adjacent flaps, and a manually actuatable member connected to one of said levers for swinging the same about its hinge to extend or retract said flaps.

4. In combination with an engine cowl, a series of adjustable flaps hinged adjacent to the trailing edge of said cowl, and means for adjusting said flaps comprising a series of lever members hinged at one end adjacent to said flap hinges and so disposed that each lever member underlies two adjacent flaps, a plurality of pivoted link members connecting each lever member with two adjacent flaps and each flap with two adjacent lever members, and manually actuatable means for moving one of said lever members to open and close said series of flaps.

5. In combination with an engine cowl and a fuselage spaced from the trailing edge of said cowl to provide a gill opening for the exit of engine cooling air, a fuselage carried support at the trailing edge of said cowl, a series of flaps hinged to said support and adjustable to control the extent to said gill opening, means connecting said flaps together to move in unison comprising, a series of lever members hinged to said support and disposed one beneath the adjoining edges of each two adjacent flaps, a pair of pivoted link members connecting the free end of each lever member to the associated flaps, and manually actuatable means connected to said lever members for adjusting said flaps.

6. In combination with an engine cowl, a series of adjustable flaps hinged adjacent to the trailing edge of said cowl, and means for adjusting said flaps comprising, a series of lever members each hinged at one end adjacent to said flap hinges and so disposed that each lever member underlies two adjacent flaps, a plurality of pivoted link members connecting each lever member with two adjacent flaps, an extension on one of said lever members, and manually operable means connected with said extension for adjusting said flaps.

7. In combination with a series of flaps arranged in a curved outline and hinged adjacent one edge, means for simultaneously swinging all of said flaps about their hinges comprising arms hinged at one end adjacent the flap hinges, and links connecting adjacent flaps with the free end of each of said arms.

8. In combination with a series of flaps arranged side by side, a curved support for said flaps, hinges connecting said flaps with said support, means for simultaneously swinging said flaps about their hinges comprising, arms pivotally connected with said support, and a pair of links connected with each of said arms at a point removed from said pivotal connection, one of said links being connected with one flap and the other link being connected with another flap.

9. In combination with a plurality of adjacent flaps hinged at an angle to each other, means for simultaneously swinging said flaps about their hinges comprising an arm hinged adjacent to the flap hinges and arranged at an angle to said flaps, and a pair of links connected at one end with said arm the outer end of one link connected to one flap and the outer end of the other link connected to the other flap, all of said link connections comprising hinged joints or pin joints.

JAMES M. SHOEMAKER.